Jan. 17, 1967 W. R. EVANS 3,299,392

ELECTRICAL CONNECTOR FOR PRINTED CIRCUIT BOARDS

Original Filed Aug. 16, 1963 3 Sheets-Sheet 1

ELECTRICAL CONNECTOR FOR PRINTED CIRCUIT BOARDS

Original Filed Aug. 16, 1963

3 Sheets-Sheet 2

Jan. 17, 1967 W. R. EVANS 3,299,392

ELECTRICAL CONNECTOR FOR PRINTED CIRCUIT BOARDS

Original Filed Aug. 16, 1963 3 Sheets-Sheet 3

United States Patent Office 3,299,392
Patented Jan. 17, 1967

3,299,392
ELECTRICAL CONNECTOR FOR PRINTED CIRCUIT BOARDS

William R. Evans, Hershey, Pa., assignor to AMP Incorporated, Harrisburg, Pa.
Continuation of application Ser. No. 302,695, Aug. 16, 1963. This application June 21, 1966, Ser. No. 561,313
11 Claims. (Cl. 339—17)

This is a continuation of copending application Ser. No. 302,695, filed Aug. 16, 1963, now abandoned.

This invention relates to an electrical connector system primarily adapted for compactness and miniatureization, though not restricted thereto. More particularly, the interengageable electrical contacts of the system are so designed as especially to end themselves to extensive density within given confines of housings containing the same, while assuring maximum efficiency in contacting surfaces on the male and female contacts per se, even though miniaturized.

Many types of electronic equipment presently in use include circuits which are of the so-called printed type and include relatively narrow strips of metal foil or lines printed from metallic inks directly upon sheets or boards of insulating material. Under certain circumstances, groups of electrical elements of various types and comprising certain modules employed for various purposes are directly supported upon certain areas of such printed circuit boards. It frequently is desired to connect substantial numbers of such module arrangements upon a given board, for example, to circuit means on one or more boards which are interconnectable with each other and with the first mentioned board. It usually is necessary that such interconnection between boards of this type shall be foolproof and indexing means usually are required to accomplish this.

To effect readily connectable and disconnectable couplings between the various circuits on circuit boards or sheets of the type described, for example, it is common practice to utilize suitable male and female electrical contacts which are interengageable mechanically to provide reliable electrical contact to complete circuits between the various boards, for example, which are to be connected by such electrical contacts. Various types of supporting means for both the male and female contacts presently are employed but the available means to support and contain said contacts do not readily lend themselves to extreme compactness and minaturization such as is required in certain electrical constructions wherein very substantial numbers of interengageable male and female contacts must be contained within relatively short linear distances or within small volumes of space.

It is the principal object of the present invention to provide an electrical connector system which is adapted for very substantial density of electrical contacts in relatively short distances and very limited volumes of space, yet affording accurate and firm positioning of the contacts in supporting means preferably being in the form of housings which quickly and economically can be formed preferably from suiable insulating material such as appropriate synthetic resins, by injection or compression molding techniques, said housings preferably being of a one-piece nature but providing for very substantial numbers of contacts to be mounted therein.

A further object of the invention is to provide unique female contacts and recesses in one of the housings to receive the same, whereby said contacts are arranged to be locked irremovably within the recesses therefor through the simple expedient of inserting preformed female contacts into such recesses from the open face thereof, said contacts including connecting means which are deformed automatically as a result of such inserting movement and thereby lock the contacts against removal from the recesses within which they are mounted.

Still another object of the invention is to provide additional detent means comprising the very simple expedient of flaring the entrance ends of the sides of the channel-type female contacts and receive such flared ends against appropriate abutting surfaces in the side walls of the recesses containing the contacts, thereby preventing outward movement of the contacts relative to the entrance ends of the recesses while additionally facilitating the slidable insertion of the leading ends of the blade-type male contacts within the channel of the female contacts.

A still further object of the invention is to provide an elongated retaining strip connectable to the female contact housing adjacent the ends of the contacts opposite the entrance ends thereof and operable to prevent removal of said opposite ends from the recesses and also provide means to cooperate with strain-relief elements connected to the leads of said female contacts which extend from the ends thereof opposite the entrance ends and thereby contribute to the compact arrangement of the contacts and the possibility of miniaturizing the same, the other detent means for said contacts preferably all being arranged adjacent the entrance ends thereof.

One other object of the invention is to provide integral interlocking of portions of the blade or rib-type male contacts directly into wall portions of the housings supporting the same for irremovable connection between said male contacts and the housings, said housings also preferably having threaded inserts molded directly thereinto, at spaced locations along the housings, to readily effect firm connection of said housing to circuit boards or other appropriate supporting means associated with circuitry to which said male contacts are to be associated in several possible ways.

Still another object of the invention is to provide selectable, fool-proof keying or indexing means positionable respectively within the housings of the male and female contacts in order that said housings may be connected together in only one certain relationship as dictated by said arrangement of keying means but the selectivity afforded by said keying means enable a selection of certain programming with relation to a single housing, for example, containing either the male or female contacts, as desired.

Details of the foregoing objects and of the invention, as well as other objects thereof, are set forth in the following specifications and illustrated in the accompanying drawings comprising a part thereof.

Figure 1:
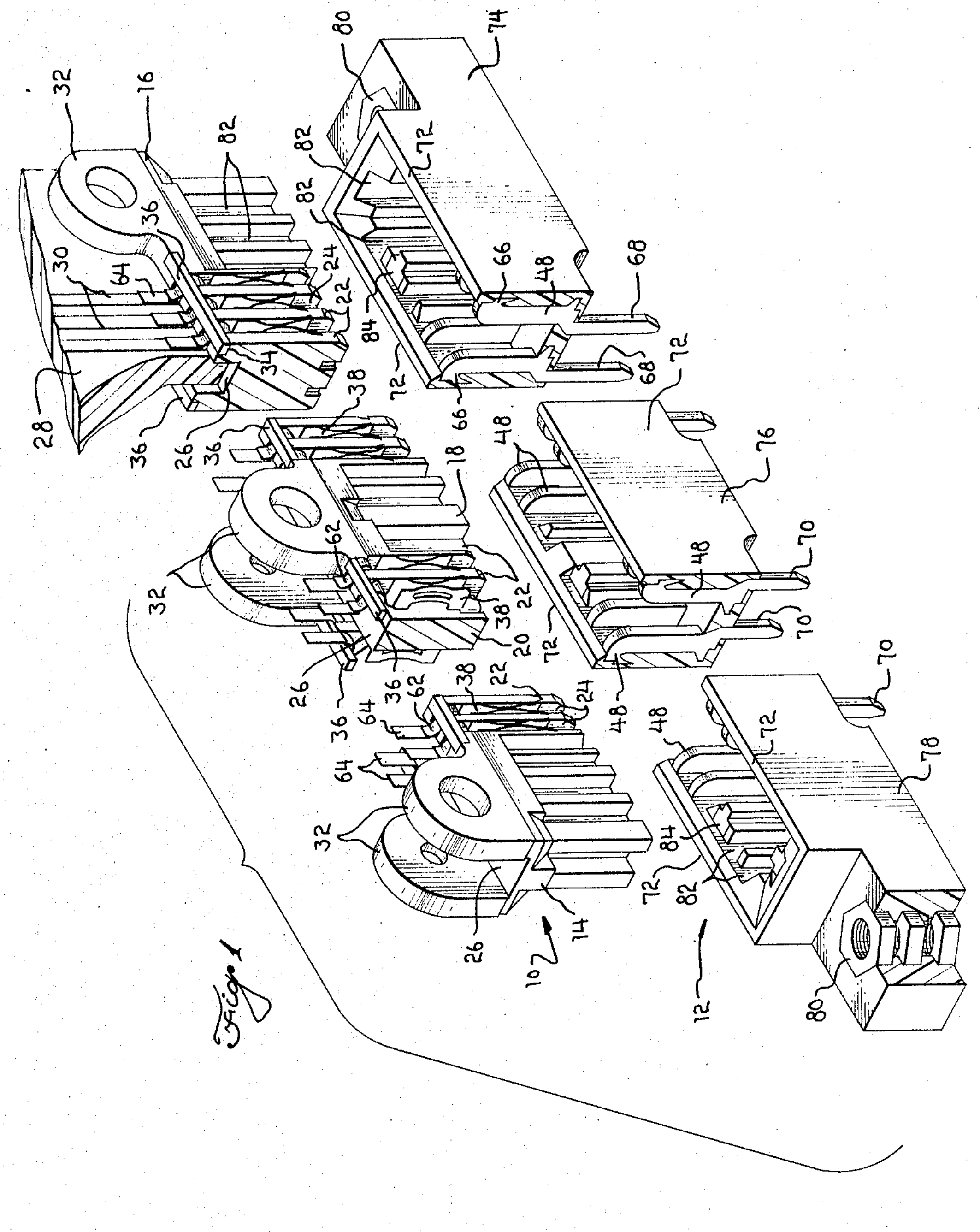
FIG. 1 is a perspective exploded view of coengageable housings respectively containing male and female contacts mounted therein in accordance with the principles of the present invention, said housings being broken at several locations to foreshorten the views and otherwise illustrate opposite end portions of said housings.

In order to afford an exemplary appreciation of the density of contacts capable of being afforded by the present invention, including miniaturization and compactness, attention is directed to the exemplary illustration of the fragmentarily illustrated female contact housing 10 and male contact housing 12 which are illustrated in perspective manner in FIG. 1. Said housings are broken into sections for purposes of foreshortening the view in FIG. 1 but, in actuality, said housings preferably are continuous and integral throughout the lengths thereof in practice.

Also, it will be seen that rows of contacts, both male and female, are illustrated as extending along opposite sides of both of said housings, thereby affording a very compact arrangement. Solely for purposes of illustration however, and without restriction thereto, the male and female contacts may be made sufficiently small, both in length, width and depth that each row thereof may comprise a total of approximately 80 within an overall housing length of approximately 5½ inches, the depth of the female housing contact being approximately ¼ inch and the width being less than ¼ inch, while the height of the male contact housing is approximately ⅜ inch and the width of the latter is only slightly more than ¼ inch. Notwithstanding this, said housings can accommodate, for example, a total of 160 slidably inter-connectable pairs of male and female contacts, all of which are connectable and disconnectable simultaneously through relative movements of the housings respectively containing the same.

Both the male and female contact housings preferably are molded from suitable synthetic resin so as to be integral throughout the length thereof and, as will be described in detail hereinafter, the female contact housing is provided with a plurality of channels or elongated recesses respectively capable of receiving metallic female contacts, while the blade-like male contacts preferably are molded, in situ, with respect to opposed walls of the male contact housing and thereby are permanently connected thereto, details of all of said housings being described hereinafter. Said housings respectively are connectable to rigid, insulating boards or the like, having circuits affixed thereto, or a point-to-point wiring system, details of which also will be described hereinafter.

Figure 3:
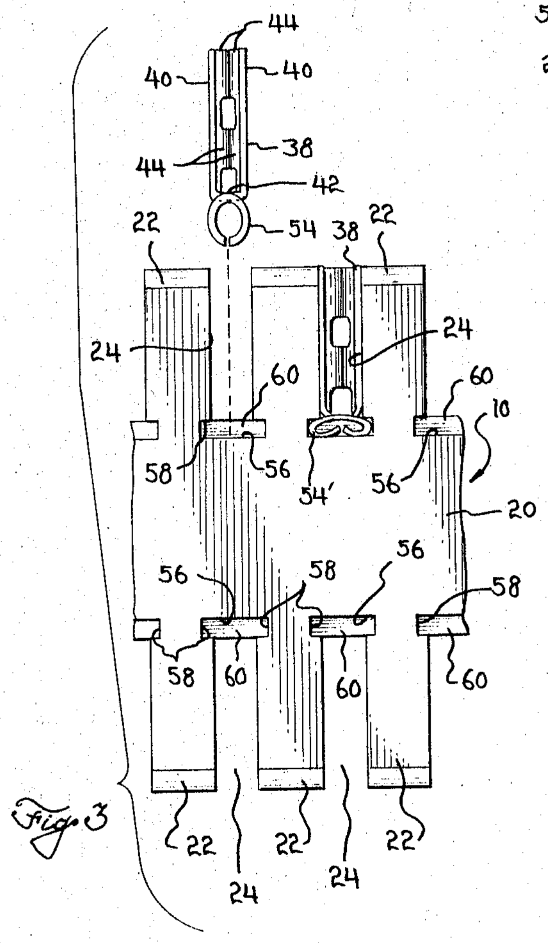
FIG. 3 is a fragmentary end face or bottom view of the female contact housing illustrated in FIG. 2 and illustrating in exploded manner an exemplary female contact in process of being inserted within a recess therefor in the housing, while another contact is illustrated in its mounted position within the recess therefor and the connecting means being disposed in locked position.

Referring further to FIG. 1, especially to the female contact housing 10, it will be seen that the same comprises opposite end portions 14 and 16, and an intermediate portion 18. Essentially however, the housing 10 primarily comprises an elongated molded strip 20 of suitable insulating material, such as an appropriate synthetic resin, whereby the same is relatively stiff and rigid. Opposite side surfaces thereof are provided with similar and substantially parallel ribs 22 which are molded integrally therewith, as best can be seen from the exemplary outer end portion 16 in FIG. 1 for purposes of defining therebetween similar elongated recesses 24 which are best shown in FIG. 3. As also best shown in end portion 16 of FIG. 1 with respect to female contact housing 10, the upper edge thereof, as viewed in said figure, is provided with a longitudinal, rectangular groove 26 for purposes of receiving one edge of a plate-like insulation board 28 which, for example, is provided with a plurality of exemplary, flat, ribbon-like circuit members 30 on opposite sides thereof, certain of such exemplary circuits being shown on the end portion 16 in FIG. 1. By way of further example, the board 28 suitably may comprise a printed circuit board, in the common terminology of the art. However, other circuit means may be arranged for connection with the female contact housing 10, if desired.

For purposes of quickly connecting the female contact housing 10 to one edge of the board 28, for example, the housing 10 may be provided adjacent opposite ends thereof, as well as intermediately of the ends thereof, with pairs of ears 32 which may be provided with axially aligned holes for the reception of clamping bolts or the like. If desired however, the ears may be affixed to opposite surfaces of the board 28 by other appropriate means such as cement or other bonding substances. Also extending along the upper surface of housing 10, as viewed in FIG. 1, adjacent opposite edges thereof, are aligned notches 34 which actually are formed in the ends of the ribs 22 nearest the board 28 but, considered in conjunction with each other, these notches actually comprise an elongated recess for purposes of receiving continuous retaining strips 36 which extend across the upper ends of the recesses 24, as viewed in FIG. 1, for purposes to be described hereinafter.

Figure 5:
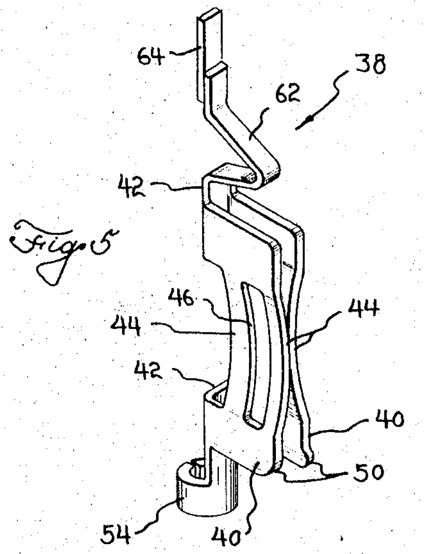
FIG. 5 is a perspective view of an exemplary female contact embodying the principles of the present invention.

Each of the recesses 24 receive a female contact 38, details of which are best shown in FIG. 5. Said contacts preferably are formed from appropriate sheet metal, by stamping dies, performing blanking operations. Each contact comprises opposed sides 40 which are connected by bottom or base portions 42 adjacent opposite ends. As also seen from FIG. 5, the sides 40, intermediately of the ends thereof, are bowed toward each other to provide opposed contact portions 44. The natural resilience of the material from which the female contacts 38 are formed will provide an inherent tendency of said portions 44 to press toward each other.

Figure 6:
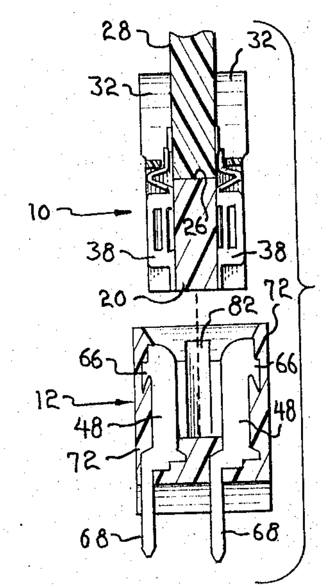
FIG. 6 is a vertical sectional exploded view of the male and female contact housings embodying the principles of the present invention arranged in position to be connected.
Figure 7:
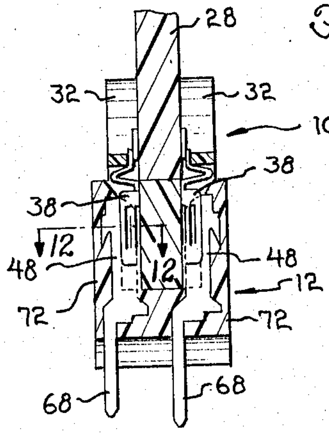
FIG. 7 is a vertical sectional elevation similar to FIG. 6 but illustrating the housings and contacts carried thereby in fully connected position.
Figure 8:
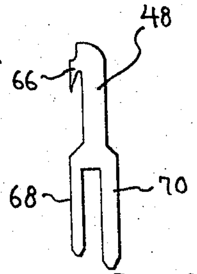
FIG. 8 is a plan view of an exemplary male blade contact of the type illustrated in FIGS. 6 and 7.
Figure 9:
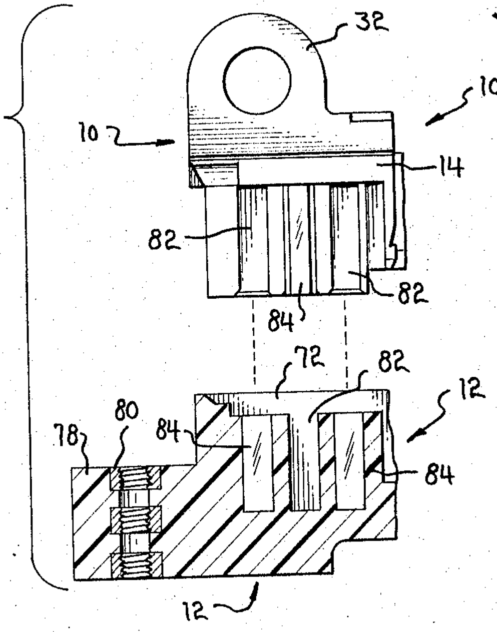
FIG. 9 is a fragmentary exploded view, partly in vertical section, illustrating the portions of one end of the male and female contact housings arranged for connection to each other and illustrating the functioning of exemplary keying means for indexing such connection, the section of the lower housing shown in this figure being taken on the line 9—9 of FIG. 10.
Figure 11:
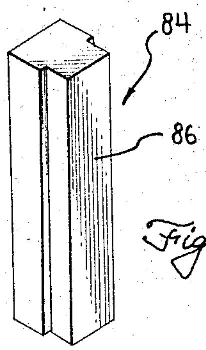
FIG. 11 is a perspective enlarged view of an exemplary key of the type employed in the structure shown in FIGS. 9 and 10.
Figure 10:
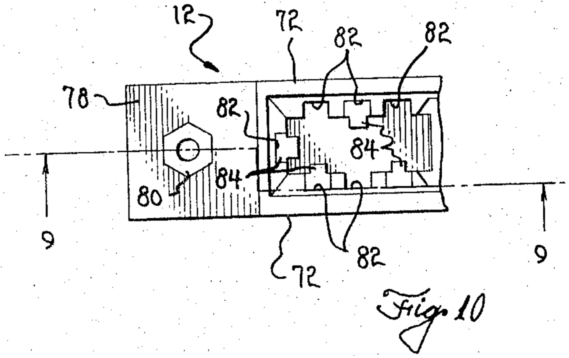
FIG. 10 is a fragmentary top plan view of one end of one of the contact housings illustrating a selected arrangement of keying means therein.
Figure 12:
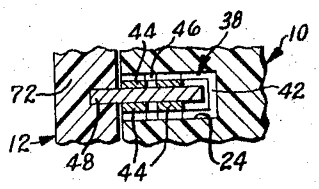
FIGURE 12 is an enlarged fragmentary sectional view taken along lines 12—12 of FIGURE 7.

Also, to provide more than two possible contact points or locations for each of the female contacts with respect to the male contacts, to be described hereinafter, which are engaged slidably thereby, the sides 40 of each of the contacts 38 preferably are bifurcated by means of slots 46, thereby providing a plurality of four bowed contact portions 44, two of the same being on each side of the contact. Accordingly, when a male blade-like contact 48, such as shown in FIGS. 6 through 8, is received slidably between the sides 40 of the female contact 38, there will be a total of four firm engagements made by the bowed contact portions 44 with each male contact and this number of firm contacts is considered adequate even for strict specifications requiring sure and certain contacts being maintained even over long periods of time of either active or inactive operation.

When the channel-like female contacts 38 are formed, the sides 40 thereof usually are not quite parallel to each other but the outer edges thereof flare outwardly apart somewhat at an acute angle to each other. However, the walls of the ribs 22 which define the opposite sides of the elongated recesses 24 are substantially parallel to each other and are spaced essentially so that when the female contacts 38 are pushed into the recesses 24 from the elongated open faces thereof, as viewed in FIG. 2, for example, the sides 40 of the contacts will be disposed substantially parallel to each other and the bowed portions 44 on opposite sides of the contact will be substantially in contact with each other. Also, the recesses 24 preferably are sufficiently deep that they will completely receive the full length and depth of the female contacts 38 as is amply illustrated in FIG. 2.

Particularly for purposes of conserving space, and also to afford the female contacts 38 with means to connect the same firmly to the recesses 24 so that they will not be movable, at least to any appreciable extent, in either longitudinal direction or transversely outward or upward therefrom, each of the female contacts 38 is provided with a plurality of connecting means and at least the principal ones preferably are all located adjacent the entrance end of the contacts 38 and recesses 24. Such connecting means are best illustrated in FIGS. 2 through 5.

Figure 2:
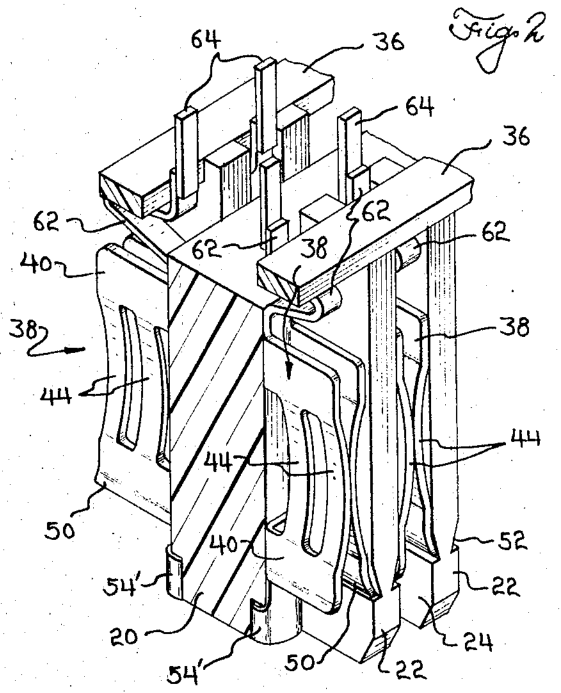
FIG. 2 is a fragmentary perspective view on an enlarged scale of a portion of the housing containing the female contacts and illustrating the connecting means as well as embodiments of electrical lead constructions employed therewith.

Particularly from FIGS. 2 and 5, it will be seen that the entrance ends extended of the sides 40, or alternatively, ears extending longitudinally from the forward edge of sides 40, in the female contacts are flared outwardly as at 50. Such flared ends readily may be formed incident to the blanking operation for the contacts. Said ends respectively are received within opposed notches 52 formed in the opposite walls defining the elongated recesses 24 in the housing 10, said notches being such as to afford walls engageable abuttingly by the end most surfaces of the flared ends 50 of the female contacts and thereby prevent outward movement of the contacts longitudinally relative to the recesses 24. Further, the flared ends 50 provide ample means to facilitate the entry of the leading ends of the blade-like male contacts 48 thereinto whereby said flared ends 50 serve a double function. Also, the interengagement of the ends 50 with the surfaces of the notches 52 which they abut readily is accomplished simply by the positioning of the pre-formed contacts 38 into the recesses 24 through the open outer ends thereof with a simple pushing movement.

Additional positioning and connecting means on the contacts 38 comprise a deformable element 54 which is arranged to be distorted or upset from its original condition incident to the movement of the preformed contacts into the recesses 58 such as shown in exploded manner in FIG. 3. From said view, it will be seen that the element 54 primarily is a hollow ellipse, which is formed, from the same metal as the contacts 38, simply by blanking opposed ears, for example, from the base portion 42 of each of the contacts and bending said ears around toward and substantially into engagement with each other, whereby the major axis of the member 54 extends substantially parallel to the sides 40 of the female contacts, as shown in FIG. 3 with respect to the uppermost contact 38.

Figure 4:
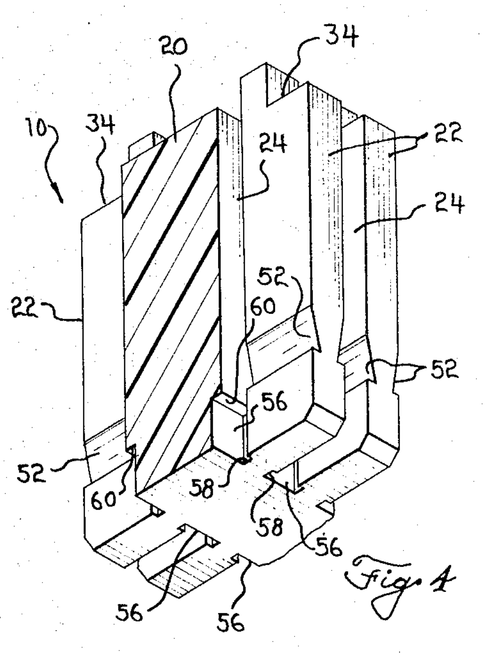
FIG. 4 is a fragmentary perspective view of a portion of the female contact housing illustrated in FIGS. 2 and 3 to illustrate details of the recesses and various abutting faces engaged by connecting means on the female contacts.

In said figure, as well as in FIGS. 2 and 4, it will be seen that there is a small undercut space 56, formed by molding, and extending inward from the outermost face of the elongated strip 20 of the housing 10, the same having overhanging locking or returning surfaces 58. Accordingly, as the movement of the female contacts 38 into the recesses 24 reaches the maximum extent, the leading end of the element 54 will contact the bottom surface of the space 56 and the continued final movement will squash or upset, distort or otherwise deform the element 54 so as to expand the major axis thereof transversely to the plane of the contacts 38 as readily can be seen best from FIG. 3.

In view of the fact that there is an additional abutting surface 60 defining the inner end of each of the spaces 56, which surfaces 60 are engaged by the inner ends of the members 54' when deformed as shown in the right-hand contact 38 in FIG. 3, such engagement of the element 54' with the surface 60 prevents inward movement longitudinally of the contacts with respect to the recesses 24 and, in addition, the engagement of the opposite portions of the deformed member 54' with the overhanging surfaces 58 of the spaces 56 will prevent lateral outward movement of the contacts 38 from the recesses 24, through the open faces thereof into which the contacts initially are inserted for installation.

Further to retain the female contacts 38 within the recesses 24 and also to provide strain relief means, the opposite ends of the bottom or base portions 42 of each of the contacts are provided with a lead 62 which is integral therewith and is formed incident to the blanking of the contacts 38 from the same sheet material. Such leads 62 preferably are formed into the U or V-shape and, if desired, the terminal ends of the leads 62 may be provided with pressure-contact securing elements 64 by which said leads may be connected to the circuit strips 30, for example, on board 28 as shown in FIG. 1, simply by compression bonding of said elements. However, any other suitable means such as soldering, welding, or otherwise may be employed to effect such connection between the leads 62 and circuit elements 30.

The V or U-shape formation of the leads 62 is for purposes of providing strain relief relative to the contacts, by providing slack between the contacts 38 and the circuit elements 30 on the board 28 to which the female contact housing 10 is connected for example. As best shown in FIG. 2, it will be seen that the retaining strips 36, which preferably are bonded or otherwise suitably connected within the notches 34 in housing 10, engage one of the bent surfaces of lead 62 and serve to snub any tension force applied to the leads 62 or the connecting elements 64 thereon. In addition, the strips 36 serve to prevent lateral outward movement of said inner ends of the contacts 38 relative to the recesses 24 within which they are positioned, thereby providing part of the connecting means therefor.

Referring to details of the male contact housing 12 which are best illustrated in FIGS. 6 through 8, it will be seen that the housing 12 preferably is substantially rectangular in vertical section and, as in regard to the female contact housing 10, the housing 12 preferably is integral from end to end and molded in one piece from suitable insulating material such as similar synthetic resin from which the housing 10 is formed. Particularly from FIG. 1, it will be seen that there is a central longitudinal channel or groove extending from end to end in the housing 12 and projecting into this channel or groove are the operative surface portions of the male contacts.

For purposes of conserving space and effecting secure connection of the male contacts 48 with the housing 12 however, the preferred construction in accordance with the present invention contemplates the inclusion of locking projections 66 on one edge thereof. In forming the housing 12, the male contacts 48 preferably are positioned in one of the mold members and the molding material is flowed around certain edge portions of the contacts 48 so as to envelop particularly the locking projection 66 thereof as well as portions of the pairs of prongs 68 and 70 thereon, as best seen in FIGS. 6 and 7, whereby the male contacts 48 will be integrally and firmly connected to the opposite side walls 72 of housing 12.

The prongs 68 and 70, if both are used in connection with a particular circuit arrangement, project beyond the confines of the housing 12, as can be seen from FIGS. 6 and 7. From FIG. 1, for example, it will be seen that the prongs 68 in the right-hand end portion 74 are utilized, whereas in at least part of the intermediate portion 76, some of the prongs 70 are utilized, as is also found in the left-hand end portion 78 of housing 12 as illustrated in FIG. 1, all of these being for illustration only however.

These prongs may be used for several purposes, selectively, as the occasion demands. For example, they may be used to project through appropriate holes in the circuit strips, for example, of a printed circuit board to which the housing 12 is to be connected. They also may be used as "wrap-around" projections to receive wire conductors for example which are simply wrapped around these prongs a number of revolutions, as the name implies. Further, aside from effecting circuit connections, the prongs 68 and 70 may be utilized to enhance the securing of housing 12 to a supporting board or the like by extending the prongs through openings in the board and clinching the outer ends of the prongs over the opposite surface of the board. If circuit elements are mounted on the opposite side of said board, for example, the clinched ends of the prongs 68 and 70 may be appropriately further connected thereto by soldering or the like.

Housing 12 also is provided with appropriate attaching means which, in the specific illustration of FIG. 1, for example, comprise interiorly threaded sleeves 80 having hexagonal extensions thereon to engage the material of the base and prevent relative rotation therebetween. Suitable bolts or screws may be connected to the attaching means 80, the same extending through a supporting board or other supporting means to which the housing 12 is to be connected thereby. Preferably, the attaching means 80 are mounted in the opposite end portions 74 and 78 of housing 12, as well as within the intermediate portion 76 thereof but such means is not seen in 76 because of the particular angle of the view.

From the foregoing, it will be seen that the electrical connector system embodying the present invention and as illustrated on the accompanying drawings, comprises a very compact, dense arrangement of interconnectable male and female contact members respectively carried by housings which are easily and firmly attachable to appropriate supporting boards or the like, carrying suitable circuit means with which the contacts are to be connected. Both edge and surface type connecting means are provided for the housings with respect to the boards or other supporting means, of a circuit nature, which are to be connected thereto.

All of the male and female contacts are interconnected or disconnected simultaneously simply by pulling the housings apart in directions transverse to the longitudinal axes thereof. Various kinds of circuitry may be connected to the various contacts, the same being programmable or otherwise. Also, to enhance the compactness and denseness of the contacts, it will be seen that rows thereof respectively are provided on opposite sides of the housings as distinguished from solely on one side. Particularly where such double row arrangement of contacts are employed, it is conceivable that fool-proof indexing of one housing with respect to the other is desirable and, to this end, the present invention contemplates the following construction.

As best will be seen from FIGS. 1 and 9 through 11, the opposite end portions 74 and 78 and intermediate portion 76 of the male contact housing 12, as well as the end portions 14 and 16 and the intermediate portion 18 of the female contact housing 10, are provided with a limited number of parallel reception channels 82 of similar size arranged to receive a selected number of orienting or indexing keys which are placed in the selected channels 82 and are affixed therein by cementing or otherwise. Since the channels 82, which preferably are only in the end and intermediate portions of the housings 10 and 12, are transversely opposite each other when the housing 10 is fully seated within the longitudinal channel provided in housing 12 thereof, it will be seen that if keys 84 are disposed in both of such transversely opposite channels 82 and housings 10 and 12, it will not be possible to fully seat housing 10 within housing 12 because the projecting rib 86 on each of the keys will conflictingly abut each other. However, if a key is mounted in only one channel of each pair of adjacent channels 82 in said housings when fully seated with respect to each other, such complete seating of housing 10 within housing 12 is possible.

From the foregoing, it will be seen that it is possible to so arrange the keys 84 with respect to the channels 82 in the several housings that it will be impossible to connect the two housings excepting in only one relationship to each other whereby such means provides, automatically, an appropriate indexing arrangement which will prevent undesired connection of circuits or, stated positively, will provide only for desired circuits on the respective boards or other circuit means, to which the housings 10 and 12 respectively are connected, to be connected through the means of the male and female contacts carried by the housings and brought into engagement with each other when the housings are fully seated with respect to each other.

The particular construction of the housings 10 and 12 described above and especially the compact and confined arrangement of both the female and male contacts which respectively are positionable in said housings, as well as the particular nature of the connecting means by which not only the male but especially the female contacts are fixed within the recesses in housing 10, not only provides firm, accurate, and durable connection between said contacts and their respective housings but the same is contained within a minimum of length and overall consumed space within said housings. Of equal importance, this is accomplished without diminution of a substantial number of assured contact points being provided between each pair of male and female contacts.

Thus, the presente invention provides interengaging contact facilities which lose none of the effectiveness of existing male and female contacts with respect to assured contact being established and maintained over long periods of time but, most importantly with respect to conservation of space, the present invention provides contacts which can be manufactured and connected in far smaller sizes than existing contacts of the type referred to and without increasing the cost of assembly of the contacts with their housings. Further, substantial latitude is afforded with respect to the male and female contact housings in regard to the types of circuit means, such as printed circuit boards and the like, which may be connected thereto in order that the circuits on said boards quickly and simultaneously may be connected and disconnected through the use of the male and female contact housings and contacts therein which are provided by the present invention.

While the invention has been described and illustrated in its several preferred embodiments, it should be understood that the invention is not to be limited to the precise details herein illustrated and described since the same may be carried out in other ways falling within the scope of the invention as claimed.

I claim:

1. Electric circuit means comprising a board-like member having circuit members carried on opposite surfaces thereof in spaced relationship to each other, an elongated female contact housing connected to one edge of said member and having a plurality of recesses on opposite surfaces thereof extending transversely to the length of said housing and opening outwardly from the edge of said housing opposite that to which said member is connected, channel-like female contacts positioned longitudinally within said recesses and connected thereto, an elongated male contact housing having a substantially central groove extending longitudinally therealong and opening outwardly from one surface of said housing, rows of parallel male contacts respectively connected to the opposite walls of said male contact housing defining said groove and extending transversely to the axis of said groove, said male contacts being slidably connectable longitudinally with said female contacts from one end thereof when said female contact housing is inserted into said groove of said male contact housing, and prongs on said male contacts projecting through one wall of said male contact housing and engageable with a board-like supporting member to which said housing is connectable, said supporting member having circuit means thereon to which said male contacts are connectable.

2. Electric circuit means comprising a board-like member having circuit members carried on opposite surfaces thereof in spaced relationship to each other, an elongated female contact housing connected to one edge of said member with said member extending away from said housing, a plurality of recesses in opposite surfaces of said housing and extending transversely to the length thereof and opening outwardly from the edge of said housing opposite that to which said member is connected, female contacts positioned longitudinally within said recesses and connected thereto, an elongated insulating receptacle having an elongated opening extending longitudinally therealong to define opposed walls to receive said housing, rows of parallel blade-like male contacts respectively connected to said opposed walls and extending transversely to the axis of said opening, said male contacts being slidably connectable longitudinally with said female contacts from one end thereof when said female contact housing is inserted into said opening, and prongs projecting from said male contacts through a wall of said receptacle and engageable with external circuit means to which said male contacts are connectable.

3. The electric circuit means set forth in claim 2 further characterized by said receptacle being molded from insulating material and said male contacts including securing means thereon molded into said opposed walls of said receptacle to attach the same thereto permanently.

4. The electric circuit means set forth in claim 2 further including a plurality of reception cavities in said female contact housing and receptacle in alignment when said housing and receptacle are juxtapositioned operatively, and indexing elements selectively positionable within the cavities on one or the other of said housing and receptacle for firm connection thereto and receivable in the mating cavity of the other to provide fool-proof indexing means.

5. The electric circuit means set forth in claim 2 further characterized by said male blade contacts each having a plurality of prongs thereon spaced apart and selectively operable to be connected electrically to a circuit on a board member to which said receptacle is to be connected or clinched against said board to secure said receptacle thereto, as desired, all but one of said prongs selectively being removable from said contacts if not needed for either of said purposes.

6. The electric circuit means set forth in claim 2 further including connecting means spaced at intervals along said housing and receptacle respectively to connect the female contact housing to an edge of a circuit board and to connect the receptacle against a surface of a circuit board, whereby at least certain circuits on said boards will be connected when the receptacle and housing are connected to couple the male and female contacts respectively carried thereby.

7. The electric circuit means set forth in claim 2 further characterized by female contacts having an entrance end for said male contacts to slide thereinto, said female contacts having connecting means of adjacent said entrance end by which they are secured against movement within the recesses of the housing therefor, and the opposite ends of said female contacts having leads thereon which include strain-relief means by which said contacts are connected to circuitry on said circuit board.

8. The electric circuit means set forth in claim 7 further characterized by the sides of said female contacts being bowed inwardly toward each other and longitudinally bifurcated, whereby four contact points are provided which are engageable with each male contact to insure positive contact over long periods of time and adapt the same to miniaturizing and compactness of said contacts.

9. The electric circuit means set forth in claim 7 further characterized by said connecting means comprising the entrance ends of the sides of said female contacts being flared outwardly and engageable with abutting surfaces in the walls defining the recesses in the female contact housing to prevent outward movement of said contacts and said contacts having additional connecting means projecting from the bottom of said contacts at the entrance end thereof oppositely to the sides of said contacts and abutting a transverse surface on said housing to prevent inward movement of said contacts relative to the recesses therefor, thereby permitting minimum length and width for said contacts to adapt the same to miniaturizing and compactness.

10. The electric circuit means set forth in claim 7 further characterized by said female contact housing adjacent the ends of said contact recesses opposite the entrance ends thereof having seat means, and further including an elongated retaining member received by said seat means and engaging the strain relief means of said female contact leads to prevent removal of the lead ends of said contacts from said recesses.

11. In an electrical contact mounted on a supporting insulating block, a groove extending along one side of said block to an end face thereof, a recess extending into said end face in alignment with and intersecting said groove and being wider than said groove to provide undercut surfaces adjacent the bottom of said groove, said contact being of sheet metal and including a base portion laid along the bottom of said groove, a pair of opposed ears extending from opposite sides of said base portion and bent around toward each other to define an oval deformable locking element forming a tube having a longitudinal axis offset from and parallel to said base portion, said element being pressed into and against the bottom of said recess, said recess being shallower than the undeformed element, said element being deformed and expanded laterally with portions underlying the undercut of said recess to lock the contact to said block and said base portion in and along said groove.

References Cited by the Examiner

UNITED STATES PATENTS

| | | | |
|---|---|---|---|
| 799,748 | 9/1905 | Mills | 339—220 |
| 1,645,090 | 10/1927 | Burgeson | 339—93 X |
| 1,984,036 | 12/1934 | Schwartzmann | 336—208 |
| 2,039,957 | 5/1936 | Hall | 339—220 |
| 2,329,471 | 9/1943 | King | 339—220 |
| 2,495,104 | 1/1950 | Huppert | 339—220 X |
| 2,755,453 | 7/1956 | Cloutier | 339—220 |
| 2,832,013 | 4/1958 | Pedersen et al. | 339—17 X |
| 3,020,510 | 2/1962 | Kuch | 339—17 |
| 3,047,832 | 7/1962 | Deakin | 339—217 |
| 3,093,768 | 6/1963 | Ayres | 339—217 X |
| 3,192,445 | 6/1965 | Evans et al. | 339—17 X |
| 3,196,377 | 7/1965 | Minich | 339—17 |

FOREIGN PATENTS

| | | |
|---|---|---|
| 505,214 | 8/1930 | Germany. |

OTHER REFERENCES

AMP "Electronic Design," Mar. 16, 1960, pp. 126, 127, 339–17.

EDWARD C. ALLEN, *Primary Examiner.*

ALFRED S. TRASK, *Examiner.*